United States Patent

Fuchs

[11] Patent Number: 5,921,136
[45] Date of Patent: Jul. 13, 1999

[54] SHIFTING DEVICE FOR SHIFTING TRANSMISSION

[75] Inventor: Robert Fuchs, Wiernsheim, Germany

[73] Assignee: Dr. Ing. H.C.F. Porsche AG, Germany

[21] Appl. No.: 08/894,405

[22] PCT Filed: Dec. 14, 1995

[86] PCT No.: PCT/EP95/04956

§ 371 Date: Dec. 29, 1997

§ 102(e) Date: Dec. 29, 1997

[87] PCT Pub. No.: WO96/25613

PCT Pub. Date: Aug. 22, 1996

[30] Foreign Application Priority Data

Feb. 17, 1995 [DE] Germany .................. 195 05 323

[51] Int. Cl.$^6$ .................................................. F16H 63/30
[52] U.S. Cl. ........................................ 74/339; 74/473.26
[58] Field of Search ......................... 74/339, 335, 473.1, 74/473.26, 473.37

[56] References Cited

U.S. PATENT DOCUMENTS

| | | | |
|---|---|---|---|
| 1,500,878 | 7/1924 | Kruchten | 74/339 X |
| 2,416,154 | 2/1947 | Chilton | 74/339 |
| 2,507,640 | 5/1950 | MacDonald | 74/339 |
| 2,593,416 | 4/1952 | Dawson | 74/339 |
| 5,477,742 | 12/1995 | Burger | 74/473.26 |

FOREIGN PATENT DOCUMENTS

| | | |
|---|---|---|
| 1 405 913 | 12/1968 | Germany . |
| 42 05 671 | 8/1993 | Germany . |
| 46-28928 | 8/1971 | Japan ............ 74/339 |

*Primary Examiner*—Khoi Q. Ta
*Attorney, Agent, or Firm*—Evenson, McKeown, Edwards & Lenahan, P.L.L.C.

[57] ABSTRACT

The shifting arrangement for a manual transmission, in which at least one transmission gear can be engaged or released by the simultaneous control of two shifting elements (synchronizing clutches), comprises two rotor elements which have guideways and are guided on a shifting shaft. One of the two rotor elements is non-rotatably but axially displaceably connected with the shifting shaft and is displaceable relative to the other rotor element.

7 Claims, 2 Drawing Sheets

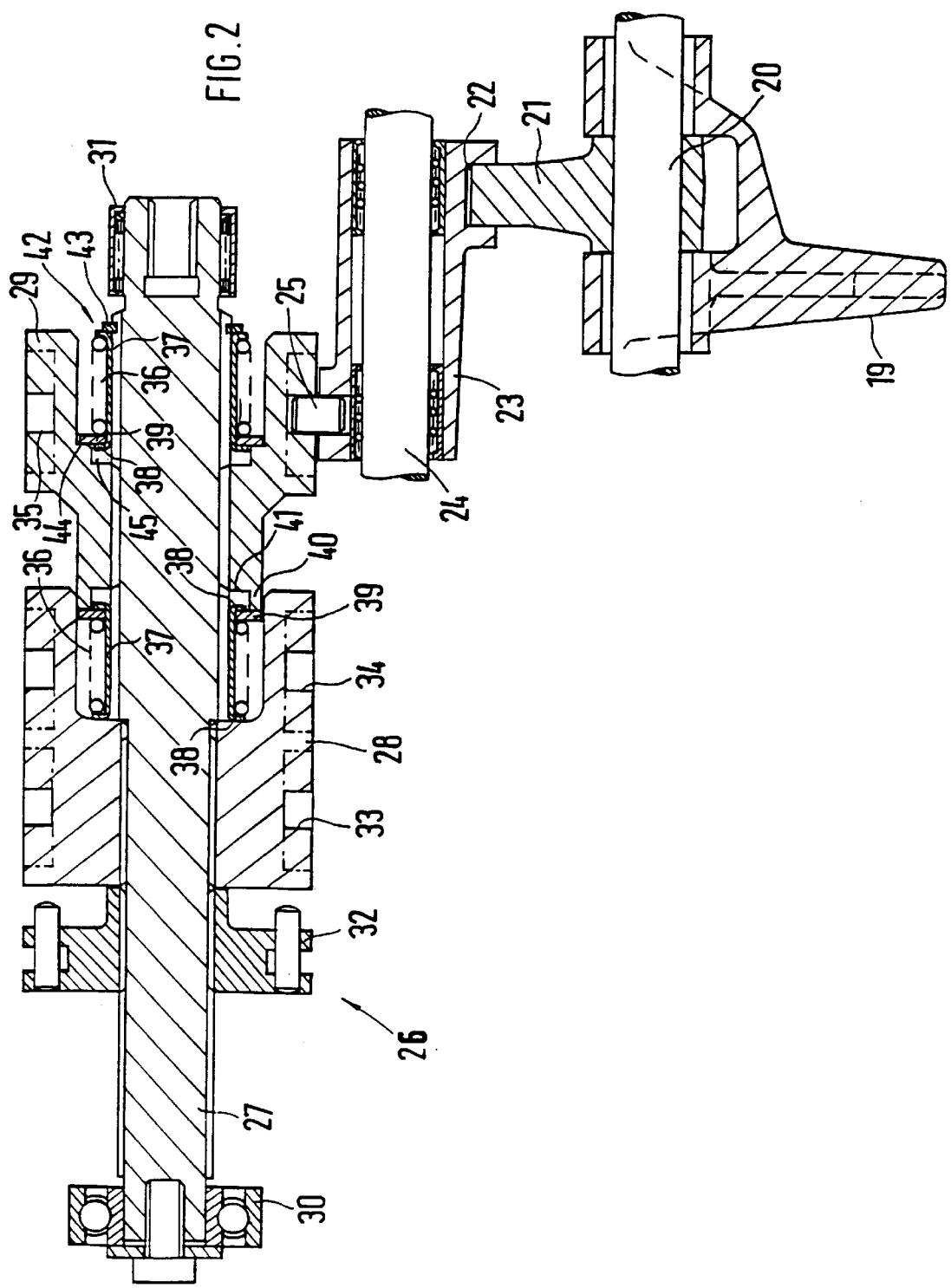

SHIFTING DEVICE FOR SHIFTING TRANSMISSION

The invention is based on a shifting arrangement for a manual transmission according to the type of the main claim.

From German Patent Document DE-42 05 671 A1, a manual transmission is known in the case of which individual transmission gears are shifted by the interaction of several pairs of gear wheels (range shifting). For the shifting operation, the controlling of two synchronizing operations is required. In order to be able to carry out the actual shifting operation in as brief a time as possible, the two synchronizing operations should take place as simultaneously as possible.

From European Patent Document EP 0 547 007 A1, a shifting arrangement is known in the case of which the shifting elements (synchronizing clutches) of a manual transmission are moved by way of shift forks which, in turn, are displaced by a rotationally moved shift roller. For this purpose, a guiding arm of the shift fork is moved in a guideway of the shift roller. By the interaction of the guiding arm and the guideway, the rotational movement of the shift roller is changed into an axial displacement of the shift fork. Although, in the case of a shifting arrangement of this type, several shift forks of the manual transmission are guided in guideways of the shift rollers extending side-by-side and are moved by them, a simultaneous moving of two shift forks and therefore of two synchronizing clutches is not easily possible. Since, because of component and manufacturing tolerances, the control paths of the synchronizing clutches and shift forks are not completely identical, it may happen that one synchronizing clutch is already completely engaged while the other has not yet covered the whole control path. Because of the narrow guiding of the guiding arms in the guideways which is required for a precise control, a tolerance compensation is not possible.

The invention is therefore based on the object of developing a shifting operating for a manual transmission in which two shifting elements (synchronizing clutches) must be moved simultaneously for the shifting of at least one transmission gear. In this case, the shifting operation is to be carried out in a secure manner and the path differences during the controlling of the individual shifting elements occurring because of component and manufacturing tolerances are to be compensated.

According to the invention, this object is achieved by means of the characterizing features of the main claim. By placing the shifting paths on at least two separate rotor elements, between which the compensation element is arranged, a sufficient separation of the two individual shifting operations is possible because the rigid coupling of the shifting elements to be moved is eliminated. Because of the compensation element between the two separate rotor elements, a path compensation is possible which compensates the different operating paths of the two shifting elements.

The shifting arrangement can be manufactured in a particularly simple manner and with low component expenditures if the at least two separate rotor elements are guided on a common shaft and are moved by it.

The compensation of the different control paths of the two shifting elements to be controlled simultaneously is permitted in a particularly simple manner if one of the two rotor elements is non-rotatably but axially displaceably arranged on the shifting shaft and the compensation element arranged between the rotor elements is a spring element. This, on the one hand, permits a continued rotation of the axially fixed rotor element or of the shifting shaft if the individual shifting operation controlled by means of the axially displaceable rotor element has already been carried out. On the other hand, because of the axial displaceability of the one rotor element, the individual shifting operation carried out therewith can be completed if the second individual shifting operation has already been carried out. The remaining path of the shifting element (synchronizing clutch), which is required for the control operation, can be followed by the axially movable shifting element.

A tolerance compensation in both directions can be carried out in a particularly advantageous manner if the axially displaceable rotor element is acted upon by mutually oppositely operating spring elements, in which case it is held in a prestressed neutral position by means of the two spring elements and is displaceable against the effect of one spring element in each of the two axial directions.

In a particularly advantageous development of the invention, an adjustment of the neutral position of the axially displaceable rotor element is possible in a simple manner if at least the spring elements are constructed as a compression spring whose axial dimension is determined by boundary devices. By means of this fixing of the axial dimension, a precise end position is assigned which corresponds to the central or neutral position of the axially movable rotor element. A high-expenditure adjustment of the interacting spring elements or a compensation of the different spring prestresses or characteristic spring curves is not required.

Additional advantages and advantageous further developments of the invention are found in the subclaims and in the specification.

An embodiment of the invention will be explained in detail in the following description and drawing.

FIG. 2 is a partial sectional representation of the shifting arrangement.

Figure 1:
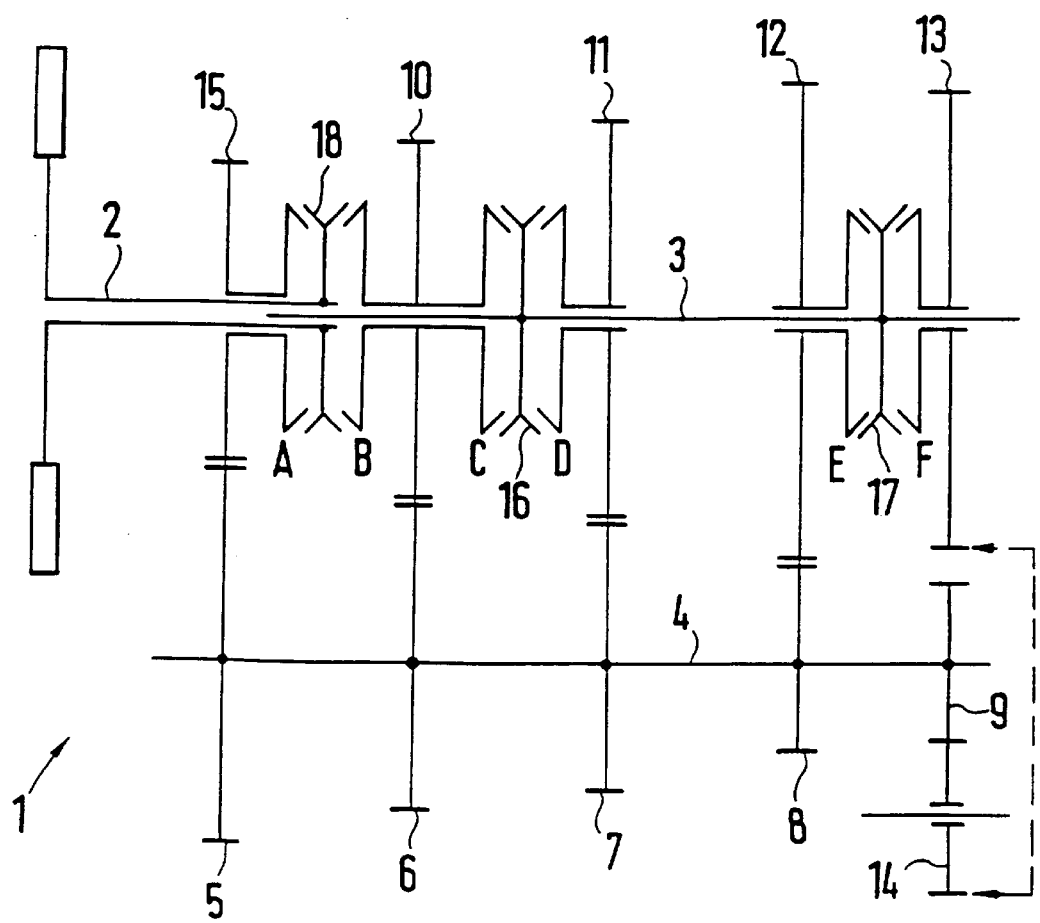
FIG. 1 is a schematic representation of a manual transmission.

The manual transmission 1 illustrated in FIG. 1 has an input shaft 2 constructed as a hollow shaft, an output shaft 3 which extends axially in parallel to the input shaft 2 and is partially guided in the hollow shaft, and an intermediate shaft 4 which is guided axially in parallel to both shafts. Five gear wheels 5 to 9 are non-rotatably mounted on the intermediate shaft 4. Four loose wheels 10 to 13 are guided on the output shaft 3, the loose wheel 10 meshing with the gear wheel 6, the loose wheel 11 meshing with the gear wheel 7 and the loose wheel 12 meshing with the gear wheel 8. By way of an intermediate wheel 14, which is used, among other things, for controlling the reverse gear, the loose wheel 13 meshes with the fixed gear wheel 9. Another loose wheel 15 is disposed on the input shaft 2 and meshes with the fixed gear wheel 5. Two synchronizing clutches 16 and 17 are non-rotatably disposed on the output shaft 3, the synchronizing clutch 16 interacting with the loose wheel 10 (individual shifting operation C) and the loose wheel 11 (individual shifting operation D). The synchronizing clutch 17 interacts with the loose wheel 12 (individual shifting operation E) and the loose wheel 13 (individual shifting operation F). A third synchronizing clutch 18 is non-rotatably disposed on the input shaft 2 and, on the one hand, interacts with the loose wheel 15 (individual shifting operation A) and, on the other hand, with the loose wheel 10 (individual shifting operation B).

The synchronizing clutches 16 to 18 are each disposed non-rotatably but axially displaceably on the input shaft 2 and the output shaft 3. By the axial displacing of the synchronizing clutches, by way of the corresponding individual shifting operations, the respectively assigned loose wheels are non-rotatably connected with the shaft. For example, for engaging the first gear, the controlling of the synchronizing clutch 18 and of the synchronizing clutch 17 is required. In this case, the synchronizing clutch 18 is engaged with the loose wheel 15 (individual shifting operation A), and the synchronizing clutch 17, by way of the individual shifting operation E, is engaged with the loose wheel 12. The flux of force through the manual transmission 1 is clearly and directly shown in the illustration according to FIG. 1. The whole gear shift pattern will not be shown in detail because it is not essential to the invention. However, it is easily derived from the transmission arrangement illustrated in FIG. 1 and is explained in detail, for example, in the initially mentioned German Patent Document DE 42 05 671 A1. However, it is easily possible, by means of the shifting arrangement described in detail in the following, to also control other manual transmissions in the case of which at least one transmission gear is engaged by the simultaneous controlling of two individual shifting operations (synchronizing operations).

As mentioned above, the synchronizing clutches 16 to 18 are non-rotatably but axially displaceably disposed on the assigned shafts 2, 3. The controlling of the individual shifting operations takes place in a manner known per se by the axial displacing of shift forks 19 which interact with the synchronizing clutches and of which, for reasons of clarity, only one is shown in FIG. 2. This shift fork 19 is fastened on a shift rod 20 which is axially displaceable by way of a shift finger 21 which is guided in a guide groove 22 of an intermediate member 23. The intermediate member 23 has a sleeve-shaped construction and is disposed on a guide rod 24 and can be axially moved on it. By way of a guide bolt 25, the intermediate member 23 is connected with the shifting arrangement 26.

The shifting arrangement 26 consists essentially of a shifting shaft 27 and of two rotor elements 28 and 29. On the end side, the shifting shaft 27 is disposed by means of two bearings 30, 31 in the transmission case of the manual transmission which is not shown in detail. The shifting shaft is rotated in steps by means of a step-by-step system which is known per se and of which only the driving part 32 is shown here which is non-rotatably connected with the shifting shaft 27. Instead of being rotated by a mechanical step-by-step system, the shifting shaft can also be rotated by an electric motor. The first rotor element 28 is fastened on the shifting shaft 27. On its outer circumference, this rotor element 28 has two surrounding guideways 33, 34 which interact either directly with a shift finger 21 or indirectly by way of an intermediate member 23 with one shift fork 19 respectively. By way of the guideway 33, the synchronizing clutch 18 is controlled, while the guideway 34 interacts with the synchronizing clutch 16. The second rotor element 29 is non-rotatably but axially displaceably disposed on the shifting shaft 27. On its outer circumference, a surrounding guideway 35 is constructed in which the guide bolt 25 of the intermediate member 23 is guided. Between the first rotor element 28 and the second rotor element 29, a captive spring element 36 is arranged whose axial dimension is bounded by a ring element 37 with surrounding shoulders 38. By means of one of the two shoulders 38, the spring element 36 rests against the first rotor element 28. On the opposite side, the spring element 36 rests by means of a retaining ring 39, on the one hand, on the shoulder 38 and, on the other hand, on a surrounding projection 40 of the second rotor element. By means of the axial course of the surrounding projection 40 on the second rotor element 29, its axial displacement path is limited in the direction of the first rotor element 28 in that the rotor element 29 comes to rest against the ring element 37 by means of its interior face 41.

On the opposite face, an analogously constructed compensating element 42 is mounted which also consists of a spring element 36, a ring element 37 with shoulders 38 and of a retaining ring 39. By means of a shoulder 38 of the ring element 37, the spring element 36 rests on the one side against a retaining ring 43 inserted in the shifting shaft 27. On the opposite side, the spring element 36 rests, by means of the retaining ring 39, on the one side, against a surrounding shoulder 44 of the second rotor element 29. On the other side, the spring element 36 rests by means of this retaining ring 39 against the shoulder 38 of the retaining ring. The shoulder 38 of the ring element 37 facing the second rotor element 29 can dip into a surrounding recess 45 of the rotor element 29. The axial course of this recess 45, analogously to the surrounding projection 40, limits the displacement path of the rotor element 29 after the rotor element has come to rest against the right ring element 37.

By the clamping-in of the axially movable rotor element 29, a spring-centered center position is predetermined. Because of the construction of the spring elements as captive springs, the center position of the axially movable rotor element 29 is easily adjustable without having to take into account possibly different characteristic spring curves or spring prestresses. By means of the axial mobility of the rotor element 29, a compensation is possible of the different control paths while the individual shifting operations take place simultaneously. If, in the example of the above-described first gear, the individual shifting operation A interacting with the guideway 33 is concluded first, the individual shifting operation E can be securely completed because of the pulling effect of the synchronizing clutch which is known per se. If, in contrast, the individual shifting operation E is concluded first, a continued rotation of the shifting shaft 27 is possible in which case, because of the interaction of the guideway 35 and the guide bolt 25, the rotor element 29 is axially displaced while simultaneously the remaining shifting path of the individual shifting operation A is continued by the further rotating of the rotor element 28.

In contrast to the embodiment illustrated here, it is possible to couple one, several or all shift forks directly with one of the rotor elements. Instead of being carried out by means of the shift forks, the shifting operation can also be carried out, for example, by way of swinging forks, in which case these are also coupled directly or indirectly with the guideway of one of the rotor elements.

In order to permit a compensation of the different shifting control paths in each shifting operation, the guideways must be assigned to the individual rotor elements such that, in the case of each shifting operation, with the simultaneous control of two shifting elements, both rotor elements or one of the guideways situated on them is effective. If, as illustrated in the embodiment, several guideways are arranged on one of the rotor elements, it should be ensured that no shifting operation is required during which the two shifting elements assigned to the individual shifting operations must be moved through guideways arranged on a rotor element.

I claim:

1. Shifting arrangement for controlling the shifting elements of a manual transmission which, for shifting the transmission gears, are axially displaceable parallel to an associated transmission shaft, at least one transmission gear being engaged or disengaged by the simultaneous controlling of two of the shifting elements, comprising at least two rotatable separate shifting rotor elements with at least two shifting paths which operatively interact with transmission devices for converting rotating movement into translational movement of the shifting elements, wherein the shifting paths are constructed on the separate rotor elements, with at least one of said shifting rotor elements being axially displaceable with respect to the other of said rotor elements, and a compensation element is arranged between shifting the rotor elements.

2. Shifting arrangement according to claim 1, wherein the two rotor elements are arranged on a common shifting shaft, and one rotor element is fixedly connected with this shafting shaft.

3. Shifting arrangement according to claim 1, wherein the two rotor elements are non-rotatably connected with one another, and the compensation element is a spring element.

4. Shifting arrangement according to claim 3, wherein the axially displaceable rotor element is acted upon in the axial direction by mutually oppositely acting spring elements.

5. Shifting arrangement according to claim 3, wherein the spring element is a compression spring whose axial dimension is bounded by boundary elements.

6. Shifting arrangement according to claim 3, wherein stops bound the axial displacement of the displaceable rotor element.

7. Shifting arrangement according to claim 1, wherein the two rotor elements have a sleeve-shaped construction and at least partially cover one another in an axial dimension thereof.

* * * * *